(12) United States Patent
Villa (10) Patent No.: US 8,567,508 B2
(45) Date of Patent: Oct. 29, 2013

(54) WELLHEAD CHANGE-OUT FLANGE AND METHOD OF USE THEREOF

(75) Inventor: Jose Villa, Aztec, NM (US)

(73) Assignee: High Tech Tools, LLC, Aztec, NM (US)

( * ) Notice: Subject to any disclaimer, the term of this patent is extended or adjusted under 35 U.S.C. 154(b) by 344 days.

(21) Appl. No.: 12/930,188

(22) Filed: Dec. 30, 2010

(65) Prior Publication Data
US 2011/0187097 A1 Aug. 4, 2011

Related U.S. Application Data

(60) Provisional application No. 61/337,505, filed on Feb. 4, 2010.

(51) Int. Cl.
*E21B 7/12* (2006.01)
(52) U.S. Cl.
USPC ........... 166/368; 166/379; 166/97.5; 285/368
(58) Field of Classification Search
USPC .......... 166/97.5, 243, 368, 378–380; 285/368
See application file for complete search history.

(56) References Cited

U.S. PATENT DOCUMENTS

2009/0032265 A1* 2/2009 Borak et al. .................. 166/379

* cited by examiner

*Primary Examiner* — Yong-Suk (Philip) Ro
(74) *Attorney, Agent, or Firm* — Rod D. Baker

(57) ABSTRACT

A change-out flange suited for use at an existing head casing of an oil or gas production well. The change-out flange is devised to replace standard hammer caps atop a well casing. By the present invention, with comparative ease a variety of wellhead equipment can be removably and interchangeably secured to the wellhead using an existing casing bowl or spool. The change-out flange has a casing hub that can be screwed unto a known casing bowl, and an integral connection flange provided with a plurality of connection holes arrayed in a manner consistent with the connection hole arrays of an assortment of conventional wellhead devices such as valves. A variety of well head devices thus can be more readily removed from, and securely replaced upon, the change-out flange. Lockdown pins are insertable into the change-out flange in a manner which secures the tubing hanger in place within the casing bowl. The disclosed change-out flange apparatus according can be installed on the wellhead casing without the need to remove pre-existing production tubing.

13 Claims, 8 Drawing Sheets (PRIOR ART)

WELLHEAD CHANGE-OUT FLANGE AND METHOD OF USE THEREOF

CROSS-REFERENCE TO RELATED APPLICATIONS

This application claims the benefit of the filing of U.S. Provisional Application Ser. No. 61/337,505, filed 4 Feb. 2010, the entire disclosure of which is incorporated herein by reference.

BACKGROUND OF THE INVENTION

1. Field of the Invention

The present invention has to do with devices and methods for operating the wellheads of active oil and gas production wells, and relates specifically to a specialized flange for fostering safe and cost-effective change-outs of equipment at a wellhead.

2. Background

There has been an unmet need in the oil and gas extraction industries for an alternative means and method for accomplishing a wellhead change out. "Change out" refers to the removal of and replacement of one set of devices atop a completed well head with an alternative device (or devices). For example, it may be desired to replace a less-desirable ball valve or thread-on gate valve with a more reliable, heavy-duty flanged master gate valve. Formerly, devices have frequently been attached to a well head by a screwed engagement with the tubing hanger, with the tubing hanger being secured to the wellhead by a screw cap. The opening at the very top of the tubing hanger is threaded interiorly, so that devices may have a screwed engagement into the top of the tubing hanger. Conventional screw caps are annular, with a set of interior threads for screwed engagement with the threads on the exterior of the wellhead top. The top of the tubing hanger is situated between the screw cap and the top of the wellhead, so that as the cap is tightened down (by screwed connection) onto the top of the wellhead, the tubing hanger is secured in place by compression between the cap and the wellhead top. Additional equipment, such as a ball valve or the like, can then be mounted at the wellhead by means of being screwed into the top of the tubing hanger. The options for changing out equipment on the wellhead accordingly has been limited, because only those auxiliary devices having a male connection for complementary threaded engagement with the female connection at the top of the existing tubing hanger, have been suitable for installation atop the existing wellhead.

SUMMARY OF THE INVENTION

Disclosure of the Invention

This invention provides a means of replacing known hammer caps for use on wellheads. According to one embodiment of the apparatus, there is provided a change-out flange for use upon an oil or gas wellhead. The change-out flange comprises a connection flange having a central axis and an outer perimeter, a casing hub depending coaxially from a bottom of the connection flange, a central aperture defined axially through the connection flange and the casing hub, a plurality of connection apertures defined axially through the connection flange, and at least one lockdown pin channel defined radially through the connection flange from the outer perimeter to the central aperture. The connection flange and the casing hub preferably are substantially cylindrical about the central axis, and preferably are formed integrally together (as by casting).

In the preferred embodiment of the change-out flange, screw threads are defined in the casing hub and around the central aperture, these hub screw threads being adapted for complementary screwed engagement with threads existing on the exterior of a top of a casing (such as a casing bowl) at the wellhead.

There is provided at least one lockdown pin removably insertable into the at least one lockdown pin channel. Preferably, the at least one lockdown pin channel is threaded along a portion of its axial length, and the at least one lockdown pin is complementarily threaded along a portion of its axial length, such that the at least one lockdown pin is screwably engageable into the at least one pin channel. The at least one lockdown pin may be screwably engaged into a lockdown position within the pin channel, and when the lockdown pin is in this lockdown position, a substantial portion of the length of the lockdown pin extends into the central aperture. Preferably, the at least one lockdown pin channel comprises a plurality of pin channels and the at least one lockdown pin comprises a plurality of lockdown pins corresponding in number to the pin channels. In one preferred embodiment, there are four equi-spaced pin channels, and a corresponding number of associated lockdown pins.

The method of the invention permits items of well head equipment to be removed, interchanged, and securely replaced upon an existing wellhead. Thus there is disclosed a method for using a change-out flange upon an oil or gas wellhead featuring the steps of detaching an item of wellhead equipment from a wellhead tubing hanger, unscrewing an existing cap from a wellhead casing, screwably mounting a change-out flange upon the wellhead casing, inserting lockdown pins radially through lockdown pin channels in the change-out flange until portions of the lockdown pins extend laterally above a top surface of the tubing hanger; and bolting an item of wellhead equipment upon the change-out flange by disposing bolts through connection apertures in the change-out flange.

The change-out flange thus is adapted for use in operative combination with a casing and tubing hanger existing at an oil or gas wellhead. The change-out flange has a connection flange having a central axis and an outer perimeter; a plurality of connection apertures defined axially through the connection flange; a casing hub depending coaxially from a bottom of the connection flange; a central aperture defined axially through the connection flange and the casing hub; and at least one lockdown pin channel defined radially through the connection flange from the outer perimeter to the axial central aperture. The casing hub has hub screw threads defined interiorly to the casing hub and around the central aperture; these hub screw threads are adapted for complementary screwed engagement with the wellhead casing, so that the change-out flange can be screwed securely and directly to the top of the wellhead casing.

The change-out flange's connection flange and its casing hub are substantially cylindrical about the central axis, and an outside diameter of the connection flange exceeds an outside diameter of the casing hub. There are connection apertures penetrating the connection flange axially (i.e., parallel to the central axis of the change-out flange) through which bolts may be disposed and secured, by which bolts a selected item of wellhead equipment (having a bolt hole pattern consistent with the flange's connection apertures), may be removably secured to the change-out flange.

As mentioned, there is provided at least one lockdown pin removably insertable into the at least one lockdown pin channel in the change-out flange. The lockdown pin may be engaged into a lockdown position within the pin channel, and when the lockdown pin is in the lockdown position, a substantial portion of the length of the lockdown pin (e.g., including an inner end thereof) extends into the central aperture and into close adjacency with a top surface of the tubing hanger, to hold the tubing hanger in place within the casing.

Accordingly, there is provided a change-out flange apparatus which replaces known wellhead cap devices.

There also is provided a method for rapid and safe change-out of devices used on wellheads.

A primary object of the present invention is to provide a method and apparatus for expanding the variety of types of devices which may be connected to existing wellhead casing bowls.

Another object of the present invention is to permit more reliable and more secure connection of equipment atop wellheads.

A primary advantage of the present invention is that it permits conventional screw-on devices, such threaded swages, which screw directly into the top of a tubing hanger, to be replaced with a change-out flange that screws directly to the casing bowl to provide a more secure and safe connection.

Another advantage of the present invention is that a ball valve or thread-on gate valve may be replaced with a flanged master gate valve atop a wellhead casing bowl or spool; the presently disclosed change-out flange, in combination with a conventional B2P flange, permits the heavy-duty master gate valve to be securely installed at the wellhead to be safer and more efficient.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

The drawings are intended to be diagrammatic only, and are not necessarily to scale either within a particular figure or between figures.

DESCRIPTION OF THE PREFERRED EMBODIMENTS

Best Modes for Carrying Out the Invention

The present invention relates to an apparatus and method useful in the field of oil and gas extraction, particularly for use at the wellhead. There is provided an alternative wellhead change-out flange for use at pre-existing independent wellheads. The apparatus and method provide for a more efficient and safe change-out, using the existing wellhead casing bowl or spool. The apparatus is a specialized change-out flange, permitting efficient change-out operations with tremendously reduced labor and equipment costs.

Significantly, the change-out flange apparatus according to this disclosure can be installed without the need to remove pre-existing production tubing. This offers a tremendous advantage, as it avoids the need to provide a work-over rig to pull production tubing. Further, practice of the present invention does not demand the use of casing plugs—nor the services of relatively expensive tool expert professionals to operate the plugs. Rather, the invention can be practiced utilizing only a wire line service and a kill truck. The presently disclosed change-out flange is specially devised to be installed on existing independent wellheads, saving thousands of dollars, per wellhead change-out, in extra services and equipment. By the present invention, a variety of wellhead equipment can be secured to the wellhead using the existing casing bowl or spool.

The present change-out flange is a thread-on flange which is attachable to the threads atop the independent wellhead where, under current practice, a hammer cap ordinarily is provided. The change-out flange has an interior threaded portion for screwed attachment to the casing bowl. The change-out flange has (for example) four lockdown pins that in turn are then used to hold down the mandrel of the tubing hanger, and also for energizing the mandrel's top seal. The change-out flange has two seals. One is an O-ring that seals the contact between an underside surface of the flange, and the other is a secondary or backup seal comprised of an injection packing thread seal provided at the treaded connection between the flange and the wellhead casing. Other known seals, or seals yet to be developed, suited to the circumstances alternatively may be used.

According to a method of this disclosure, a change-out flange is used to permit rapid and cost-effective changing of wellhead devices and items of equipment, including valves, manifolds, and the like.

Figure 1:
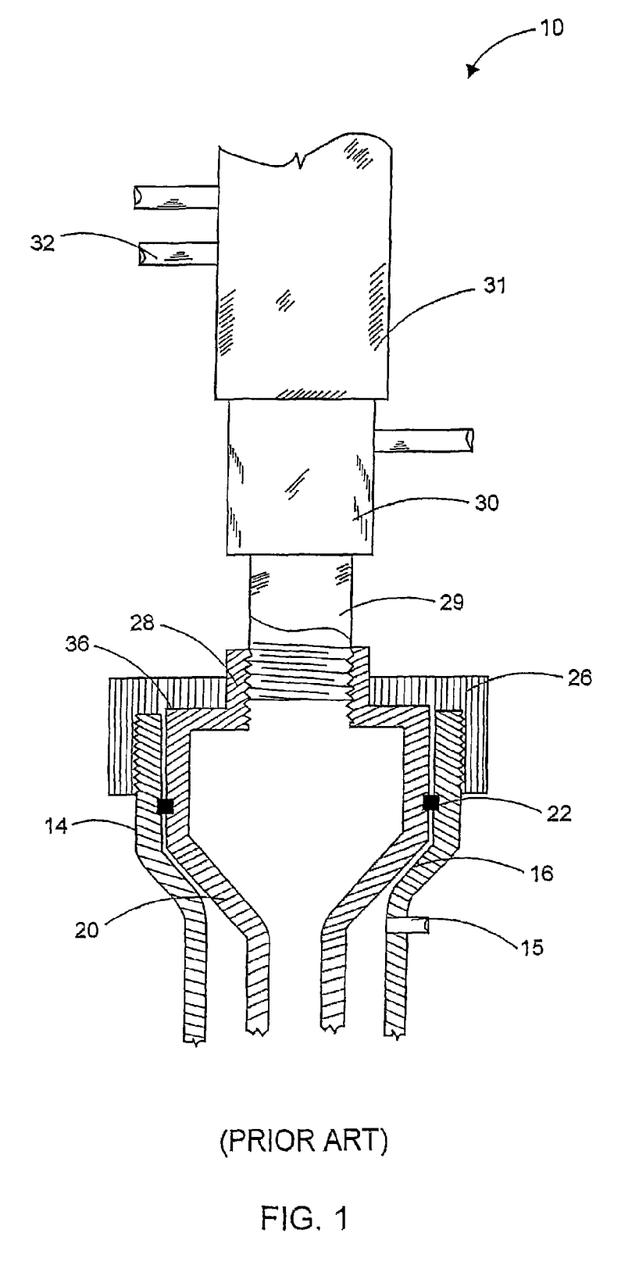
FIG. 1 is a side view diagramming, in partial cross section, an example of a known wellhead assembly including a standard wellhead cap to secure the tubing hanger, and other components mounted on the tubing hanger.

Attention is invited to FIG. 1, a diagram showing a wellhead with conventional equipment mounted thereon. The assembly of FIG. 1 characterizes generally the "prior art," and is a non-limiting example of an existing circumstance where the present invention could be beneficially exploited. The wellhead 10 includes the typical bowl or spool 14 at the top end of the well casing. An outlet 15 below the casing bowl 14 provides for the attachment thereto of a casing valve (not shown) of any suitable type, for controlled release of gas produced between the casing and the production tubing. The casing bowl 14 has the usual divergent walls that provide for the shoulder 16 upon which the production tubing may hang, also according to convention. There is a tubing hanger 20 having an uppermost portion of larger diameter, whereby the top of the tubing hanger 20 rests by gravity upon the shoulder 16 of the wellhead casing bowl 14. The production tubing (conventional, not shown) is connected to (typically by threaded engagement), and hangs from and below, the bottom of the tubing hanger 20, again, according to known practices. One or more annular seals 22 may be provided as known in the art for sealing the contact between the tubing hanger 20 and the casing bowl 14. The tubing hanger 20 is hollow according to convention, so to permit fluid flow upward therethrough from the production tubing. As seen in FIG. 1, the topmost portion of the tubing hanger 20 has a tubing hanger outlet hub 28 extending upwardly there from. Defined centrally in the outlet hub 28 is a tubing outlet 24 that is generally coaxial with the tubing hanger 20 and the production tubing. The hanger outlet hub 28 has interior screw threading, whereby a variety of devices can have a screwed attachment to the top of the tubing hanger 20. For example, in FIG. 1 a swage 29 has a bottom male portion that is threaded complementarily for connection to the interior of the tubing hanger outlet hub 28.

The tubing hanger 20 rests by the force of its weight in the casing bowl 14. Gas pressure within the well casing, however, tends to push with considerable force upward upon the tubing hanger 20. Consequently, in a typical completed well, the tubing hanger 20 must be held in place by a well-known type of wellhead cap 26. The cap 26 is annular, and has interior threading complementary with screw threads on the exterior of the top of the casing bowl 14, so that the cap can have a secure screwed engagement (often hammer-driven, i.e., a hammer is used manually to rotate forcibly the cap) with the casing bowl 14 of the wellhead. Again as seen in FIG. 1, the cap 26 is screwed down firmly against the upper flange surface 36 of the tubing hanger 20, and thus firmly holds the tubing hanger down and atop the casing bowl 14. The wellhead cap 26 has a central aperture therein through which the tubing hanger outlet hub 28 may extend.

Referring still to FIG. 1, it is seen that at a wellhead any of a number of devices may be attached atop the tubing hanger 20 by being screwed into the tubing hanger 20. In FIG. 1, which is only an illustrative example, a male swage 29 is engaged into the outlet 24 by the threaded connection with the tubing hanger outlet hub 28. A ball valve 30, for example, may then have a screwed connection to the top of the swage 29. In this example, a plunger catcher 31 of standard configuration has a fluid connection atop the ball valve 30. According to a known procedure, a plunger (not shown) can be controllably reciprocated within the well, including within the catcher 31 portion of the wellhead assembly, to lift produced water up the production tubing from down-well, for expulsion from one or more outlets 32 in the catcher 31.

A potential drawback of the arrangement seen in FIG. 1 is its vulnerability to failure and rupture, for example during the pumping of water by operation of a plunger within the wellhead assembly, as described above. The vigorous powered action of the plunger within the catcher 31, as well as the application of large, leveraged, lateral and bending forces incidentally and unintentionally applied to the catcher 31 by equipment driving the plunger, may cause unsustainable bending moments at the juncture between the catcher and the ball valve 30—or between the ball valve and the swage 29.

The versatility of a conventional wellhead assembly, such as the example above as seen in FIG. 1, is limited in that only devices particularly adapted for screwed engagement into the hanger outlet hub 28 may be mounted atop the wellhead casing. Further, screwing an item of equipment, such as a swage 29, into the tubing hanger 20 does not provide for an optimal connection; what is needed is a connection that is resistant to leveraged forces on the tubing hanger 20 resulting from lateral forces unintentionally applied to equipment (e.g., ball valve(s) 30 or a plunger catcher 31, etc.) at higher elevation in the wellhead assembly. This less-than-optimum condition is aggravated by the fact that the tubing hanger 20 is held in place only by the compression of the tubing hanger between the wellhead cap 26 and the casing bowl 14.

To expand the variety of devices that may be mounted atop the wellhead, as well as to dramatically improve the reliability of the connection, the presently disclosed apparatus and method permit users to dismiss the use of the wellhead cap 26, and to deploy a more versatile change-out flange. The use of the present change-out flange not only permits a wider variety of devices to be used directly atop the wellhead casing, but also improves the security of the connection.

Figure 2:
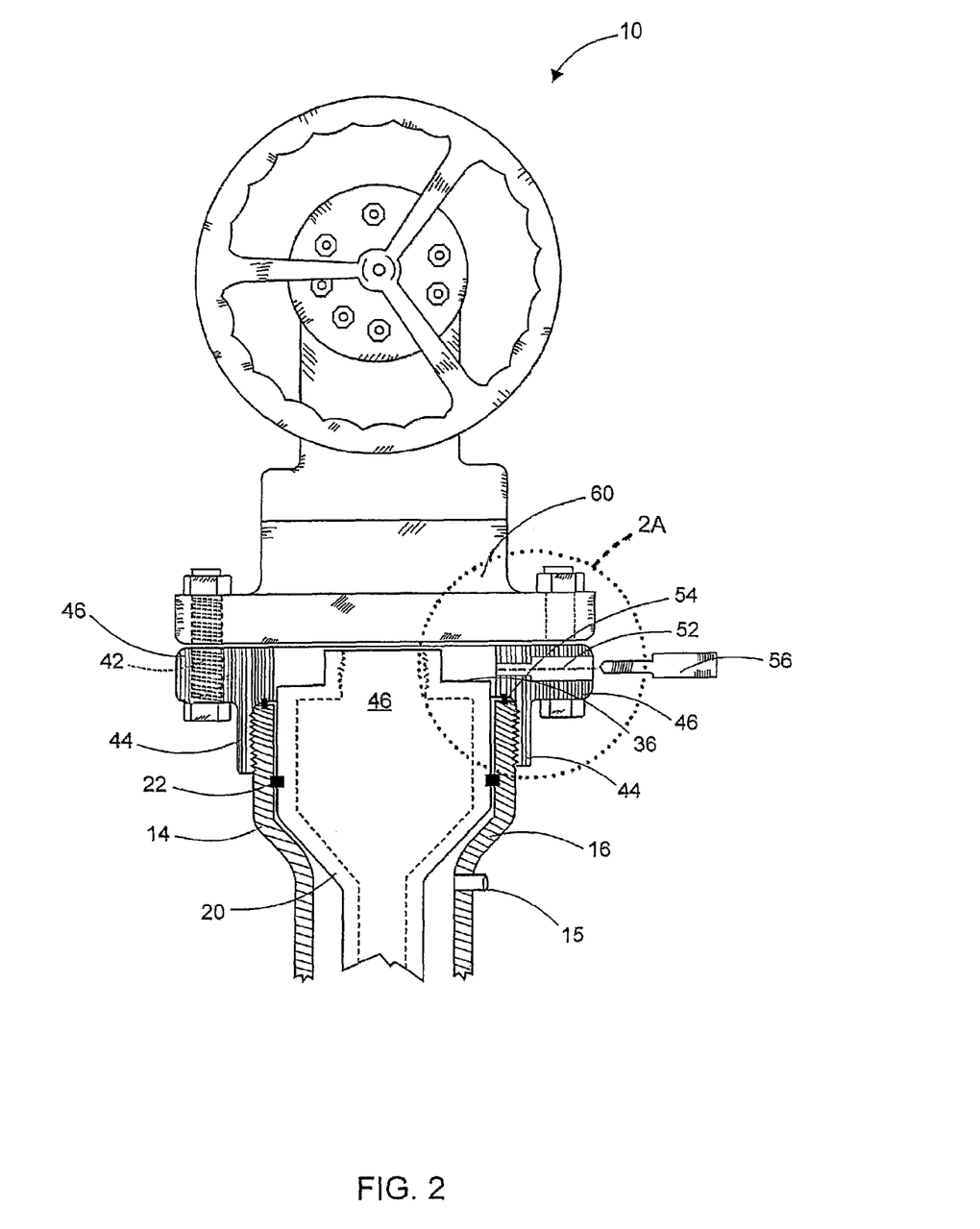
FIG. 2 is a side view diagramming, in partial cross section, of a wellhead assembly including a change-out flange according to the present disclosure attached atop the wellhead casing, and a master gate valve bolt-mounted upon on the change-out flange.

FIG. 2 shows by way of example a beneficial wellhead assembly made possible by the disclosed change-out flange 40 apparatus and method. Components and elements common to both FIGS. 1 and 2 are labeled with identical corresponding label numbers; the casing bowl 14 and its outlet 15 and shoulder 16, and the tubing hanger 20 and seals 22, being substantially the same or similar to those depicted in FIG. 1. In FIG. 2, the change-out flange 40 is shown mounted upon the casing bowl 14 at the top of a wellhead, there being a conventional tubing hanger 20 situated within the casing. The present change-out flange 40 provides hold-down security to the tubing hanger 20, but also allows a much wider variety of equipment to be securely mounted atop the wellhead 10.

The change-out flange 40 is generally annular, and has interior threading complementary with threads on the outside of the casing bowl 14 so to be capable of screwed engagement with the casing bowl 14 (similarly to the mode of connecting the cap 26 to the casing as explained above). As described further herein, the flange 40 also has a plurality of bolt apertures 42 there-through, permitting heavy-duty devices, such as the master gate valve 60 seen in FIG. 2, to be securely connected to the wellhead, via the flange 40, by means of bolts. For example, the presently disclosed flange apparatus and method may be practiced with API Type B-7 bolts. FIG. 2 illustrates that the interior threads inside the casing hub 44 of the change-out flange 40 have a screwed engagement with the complementary exterior threads of the casing bowl 14. The threading regime or thread specification for the outsides of various casing bowls 14 is known in the industry, so flanges 40 may be manufactured with the appropriate thread specification to match a particular model of casing bowl. The change-out flange 40 thus may be securely connected to the casing by the means of this invention. This is in distinction from securing equipment (such as a swage) directly to the tubing hanger 20 (as is the situation typically). This permits a master gate valve 60 (or the like) to be bolted securely to the flange 40, as indicated in FIG. 2.

It is understood that the sizes and dimensions recited herein or in the drawing figures are exemplary only. The change-out flange 40 may be configured in a wide variety of sizes, shapes, and thread types, to permit usage on any of the independent wellhead casings known in the industry. In particular, the diameter and thickness, central aperture diameter, as well as the sizes and numbers of bolt apertures, may be adapted at the time of manufacture for use in connection with the various casing bowls known in the industry and the equipment to be attached to the wellhead a particular site. Screw thread types and specifications also may be customized to permit secure attachment to the cap at a particular wellhead.

FIG. 2 shows one of a plurality of lockdown pins 56 that are insertable into correspondingly numbered and shaped lockdown pin channels 52 defined radially in the flange 40. In the flange apparatus, the pin channels 52 preferably number at least three, and more preferably four, equi-spaced about the circumference of the flange 40. The pin channels 52 preferably are interiorly threaded along at least a portion of their axial lengths; a corresponding portion of the exterior of each lockdown pin 56 is threaded complementarily. Each lockdown pin 56 thus preferably can be controllably screwed into a corresponding pin channel 52, for the purpose of securing the tube hanger 20 against upward movement in the casing bowl 14. Each pin 56 has sufficient axial length so that when fully installed into its associated threaded pin channel 52, a forward portion of the pin extends into adjacent contact with the top bearing shoulder 36 of the tubing hanger 20. The pressing of four lockdown pins 56 against the shoulder 36 of the tubing hanger 20 secures the tubing hanger within the well casing. Thus, in the practice of the invention, the function of securing the tubing hanger against upward shifting is filled by the flange 40 and pins 52, rather than being performed by a cap 26 (FIG. 1).

Figure 3:
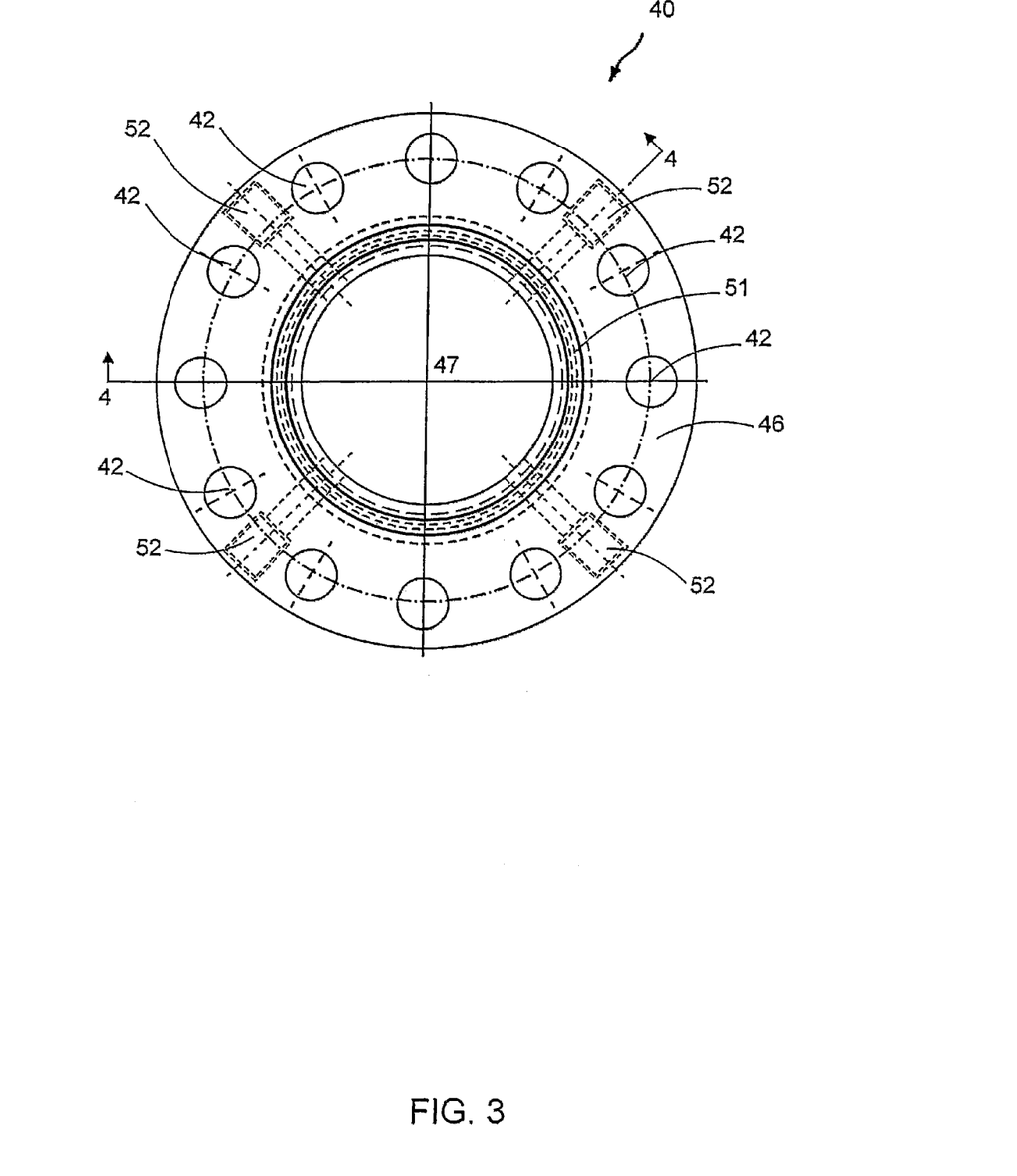
FIG. 3 is a top or axial view of the change-out flange according to the present disclosure.
Figure 4:
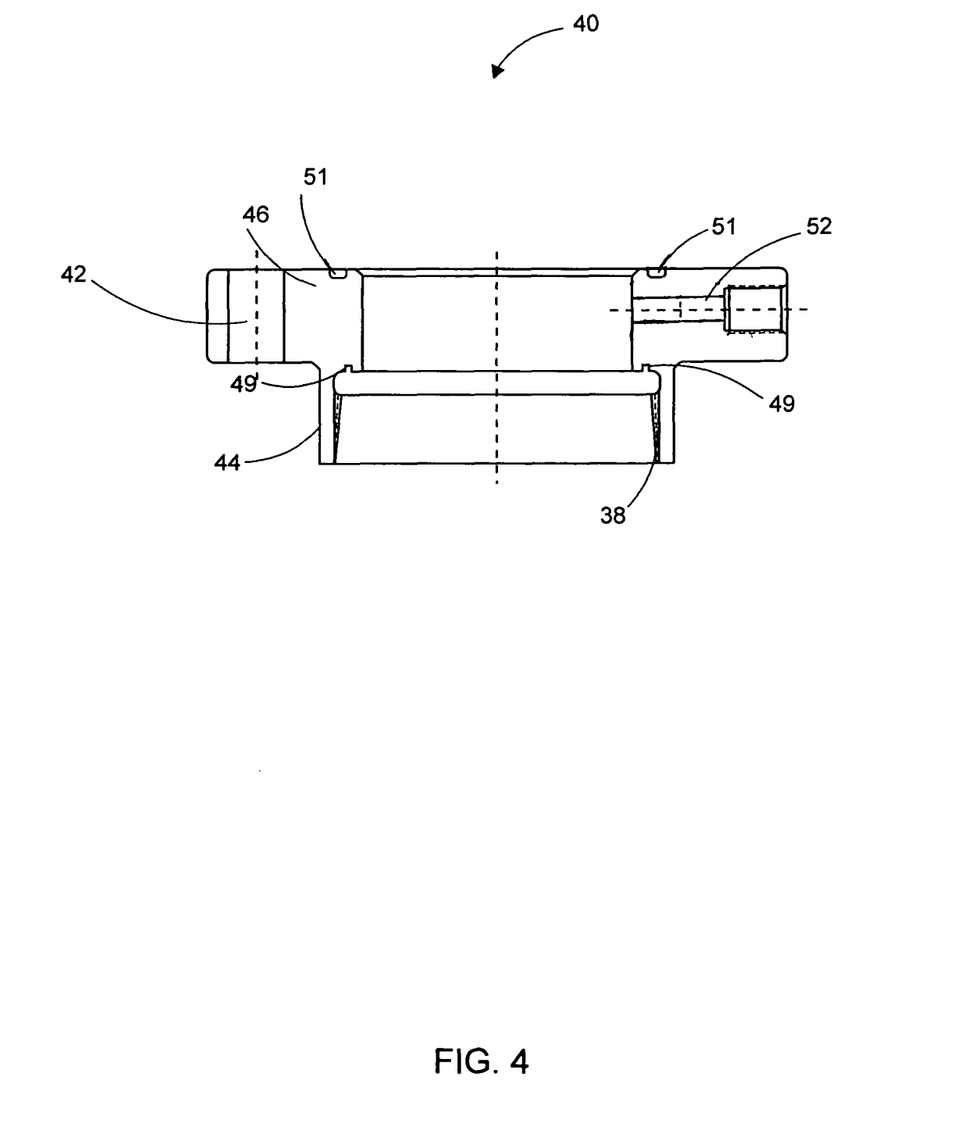
FIG. 4 is a side sectional view, taken along section line 4-4 in FIG. 3, of the change-out flange seen in FIGS. 2 and 3.
Figure 5:
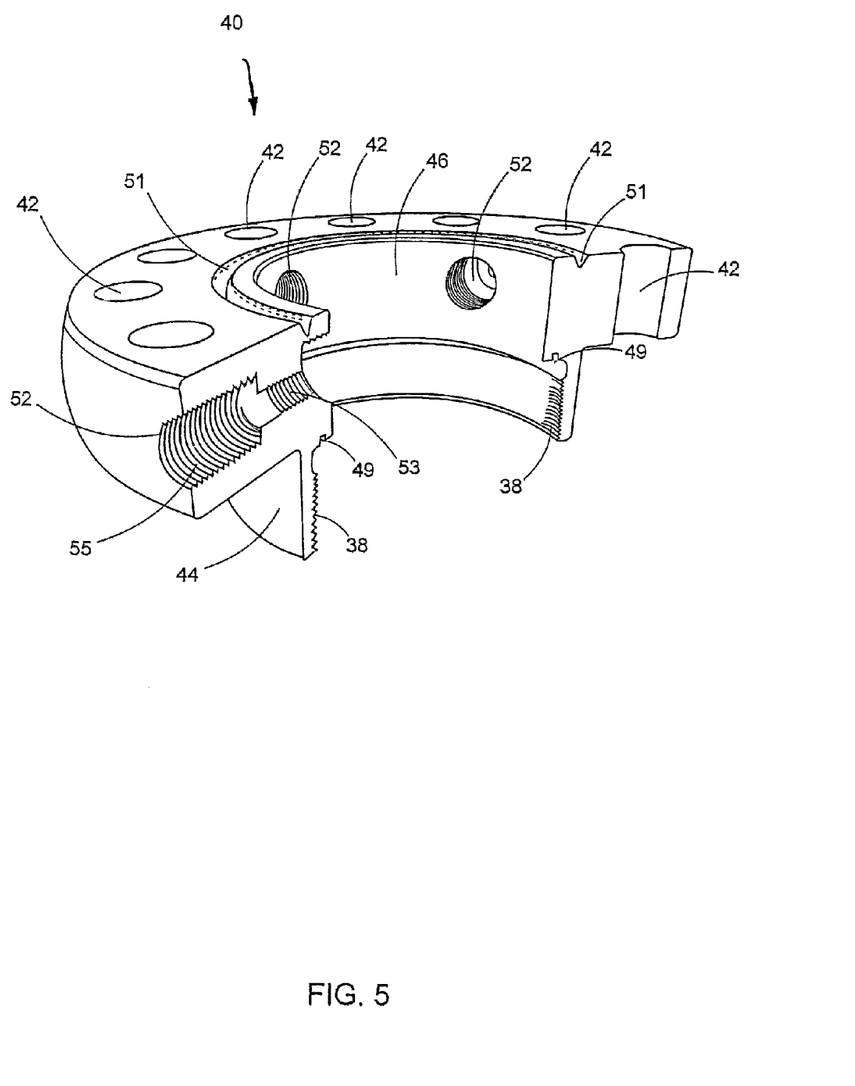
FIG. 5 is a perspective view of the change-out flange depicted in FIGS. 2-4, with a portion broken away to reveal certain interior features.

FIGS. 3-5 depict in further detail a preferred embodiment of the change-out flange 40 according to the present disclosure. The change-out flange 40 has two principal portions, the casing hub 44 and the connection flange 46, which preferably are integrally formed (e.g., by being cast simultaneously together) from alloy 4140 steel. However, it should be immediately appreciated that the flange may be composed of other specialized materials, adapted to the well-head conditions. If the well produces gasses such as $H_2S$ or $CO_2$ which may be corrosive or otherwise problematic to the strength or durability of the wellhead components, the flange 40 and associated can be manufactured from specialized corrosion-resistant alloys known in the art. As best seen in FIGS. 3 and 4, the connection flange 46 has a central axis and an outer perimeter; the casing hub 44 is coaxial with the connection flange and extends from the connection flange. The central aperture 47 is defined axially through both the connection flange 46 and the casing hub 44.

Figure 2A:
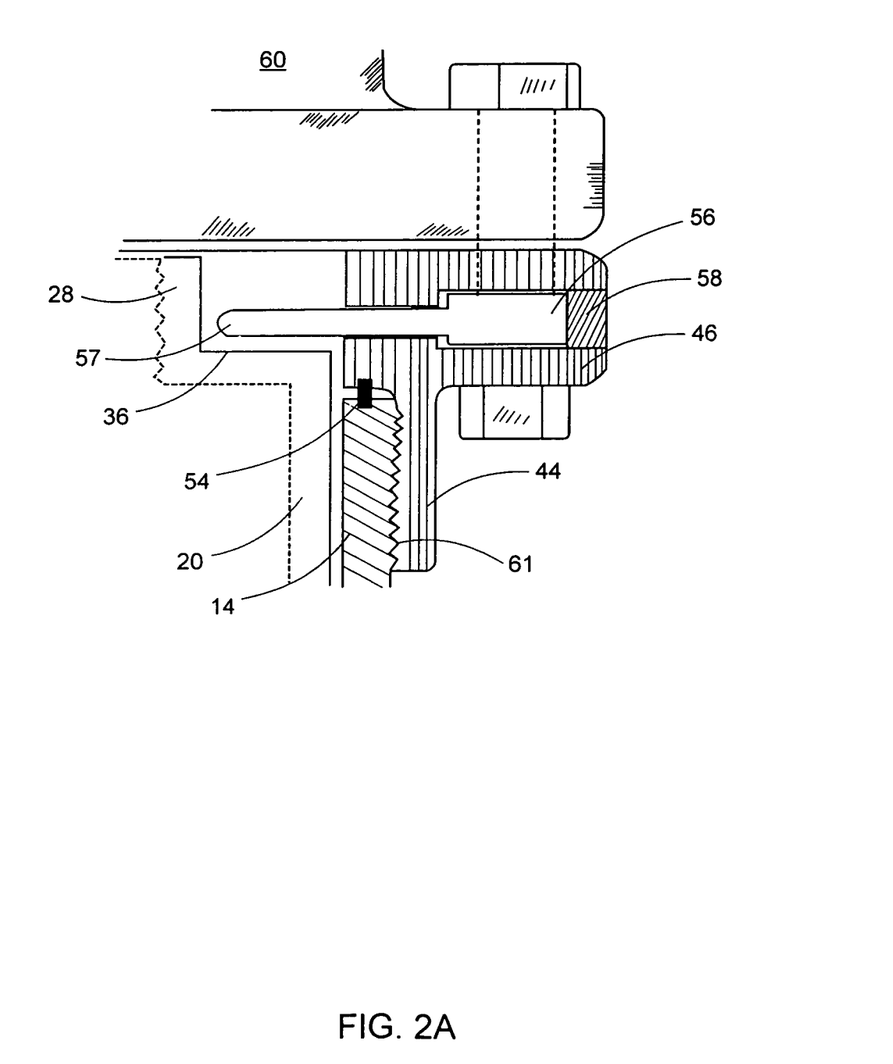
FIG. 2A is an enlarged view, in partial cross section, of that certain portion designated at 2A in FIG. 2, showing one of the plurality of lockdown pins, inserted into the lockdown pin channel in the change-out flange, the pin engaging the top shoulder of the tube hanger to hold it in place.

The connection flange 46 and the casing hub 44 preferably but not necessarily are generally cylindrical about their shared central axis. In the preferred embodiment, the circular (in plan view) connection flange 46 has an outside diameter, for example approximately 15 inches, suited for the connection thereto of standard bolt-down equipment. Depending from the bottom or underside of the connection flange 46 is the casing hub 44 of smaller outside diameter, e.g., approximately 9.25 inches. As best seen in FIG. 3, the change-out flange 40 has a central axial aperture 47 there-though, into which the upper portions, e.g., the outlet hub 28, of the tubing hanger 20 may be disposed (FIGS. 2 and 2A). The outside diameter of the connection flange 46 substantially exceeds the outside diameter of the casing hub 44; this promotes access to both the top and bottom of the outer annular portion of the connection flange so that bolts can be passed through the connection apertures 42 in order to releasably mount (using threaded nuts) a selected item of wellhead equipment 60 upon the connection flange 46, as indicated in FIGS. 2, 2A, and 7.

Figure 7:
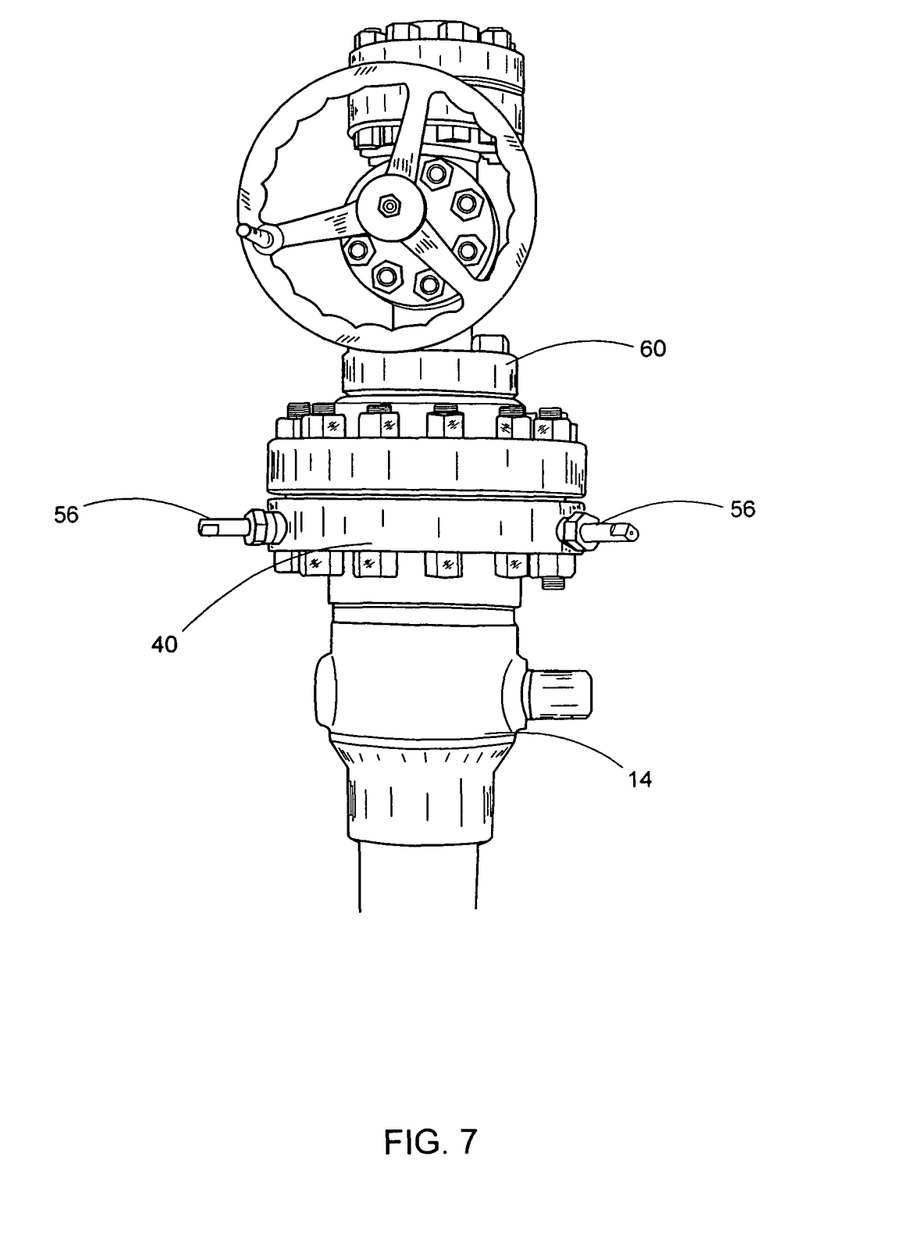
FIG. 7 is a side view of a wellhead assembly depicting the change-out flange according to the present disclosure, in use to secure the tubing hanger in the casing bowl, and also mounting a bolt-on master gate valve; two of four lock-down pins are shown extending from the change-out flange, which pins engage the top of the tubing hanger to hold it in place.

The interior of the flange's casing hub 44 is provided with threads 38 complementary to the exterior threads on the casing bowl 14, so that the flange 40 can be securely screwed onto the top of the wellhead casing (FIG. 7). A circular seal groove seat 49 may be provided in the underside of the interior of the connection flange 46, near the central aperture 47, as seen in FIGS. 4 and 5, into which a suitable O-ring seal (54 in FIG. 2) may be disposed to provide a reliable seal between the tubing hanger 20 and the flange 40 when the two are screwed together.

The radially extending connection flange 46 portion of the change-out flange 40 is fully penetrated axially by an array of connection apertures 42 there-through. In the preferred embodiment, the connection apertures 42 are twelve in number, and are uniformly spaced at 30-degree intervals around the flange 40. Each aperture 42 has a diameter of, say, 1.43 inches for receiving standard connection bolts. The number and arrangement of connection apertures 42 preferably correspond to a selected industry standard bolt-hole configuration (e.g., the pattern of a B2P flange), such that a variety of devices having the same aperture array can be securely bolted to the flange 40. However, it is understood that the number and array configuration of the connection apertures may differ between separate embodiments of the flange 40; it is contemplated that the flange apparatus of the invention may be fabricated in a variety of differing diameters, including the diameter of the central aperture 47 and the overall diameter of the flange, to accommodate different wellhead casings (with their casing bowls) and different types of wellhead equipment (such as swages and valves) that may desirably installed above the casing bowls.

As seen in FIGS. 3-5, the top surface of the flange 40 preferably has defined therein a circular seal groove 51 coaxial and proximate with the central aperture 47. A suitable gasket or O-ring (not shown in FIGS. 3-5, but shown as 54 in FIGS. 2 and 2A) may be disposed into the seal groove 51 to provide a reliable seal between the change-out flange 40 and any device connected thereto (in contact with the flange's top surface).

The connection flange 46 has at least one, possibly two, preferably at least three, and most preferably four, lock-down pin channels 52 defined radially therein. (A plurality of more than four lock-down pin channels also may be contemplated, in the event extra fastening security is desired.) The pin channels 52 are equi-spaced about the perimeter of the connection flange 46. For example, four pin channels 52 preferably are spaced at 90-degree intervals, and are directed through the connection flange 46 radially inward toward the axial center of the overall change-out flange 40. Each pin channel penetrates the connection flange 46 completely from the outer circumference of the flange to the central aperture 47.

As illustrated in FIGS. 3 and 4, but best seen in FIG. 5, each pin channel 52 has two diameters along discrete segments of its axial length. An inner segment 53 of a channel 52 has a smaller diameter and, preferably, finer threads (FIG. 5) along a selected length thereof, by which a lockdown pin 56 (FIG. 2) can be screwed into the channel 52. Screw threads on the forward portion of a lockdown pin 56 engage with the fine threads of inner segment 53, so that rotation of the pin 56 regulates the screw-driven movement of the pin 56 radially inward into the flange 46; counter-rotation retracts the pin 56 outward. An outer segment 55 of the channel 52 has a comparatively larger diameter, and is provided with a coarser thread (FIG. 5) for receiving therein an exteriorly threaded gland nut (not shown in FIG. 5) for holding the pin 56 in place within the channel 52. Packing seals of known availability and configuration (not shown) optionally may be disposed in the channel 52 in a conventional manner to seal the passage between the channel 52 and a pin 56 disposed therein.

FIG. 2A illustrates in further detail the provision and function of the lockdown pins 56 in the flange apparatus. FIG. 2A is an enlarged portion of FIG. 2, showing one of the lockdown pin channels 52 in the connection flange 46 of the overall change-out flange 40, except that the lockdown pin 56 is shown installed in its functional position. When installed, a forward portion 57 of the lockdown pin 56 extends radially into the central aperture 47 of the flange 40 so to be situated axially above the top shoulder 36 of the tubing hanger 20. In a preferred embodiment, when a lockdown pin 56 is fully and properly installed, the forward portion 57 is immediately above the top shoulder 36 of the tubing hanger, or may even come into flush contact with the top shoulder. The balance of the lockdown pin 56 remains secured within the pin channel 52. A gland nut 58 has a threaded engagement into the pin channel 52, "behind" the outer end of the pin 56, to assist in holding the pin in position within the channel. While in FIG. 2A the forward portion 57 of the lockdown pin 56 is not seen directly in contact with the tubing hanger 20, it is understood that it nevertheless prevents significant upward shifting of the hanger; in a preferred embodiment of the apparatus, the pin 56 actually makes a slight pressing contact with the shoulder 36 of the tubing hanger.

It is seen, therefore, that at least one lockdown pin 56 is removably insertable into at least one lockdown pin channel 52. Each lockdown pin channel 52 is threaded along a selected portion of its axial length, and an associated lockdown pin 56 is complementarily threaded along a portion of its axial length, such that the lockdown pin is screwably engageable into its corresponding pin channel 52. In the embodiment seen in FIG. 2, the least one lockdown pin may be screwably engaged into the lockdown position within the pin channel, as depicted in FIG. 2A; when the lockdown pin 56 is in the lockdown position of FIG. 2A, a substantial portion of the length of the lockdown pin extends into the central aperture 47. In the preferred embodiment, there are a plurality of pin channels 52 and a plurality of lockdown pins 56 corresponding in number to the pin channels; as suggested by FIG. 4, the pin channels 52 (and thus the lockdown pins 56) number four, and the pin channels preferably are equi-spaced 90 degrees from each other about the change-out flange's central axis.

Continued reference to FIG. 2A shows that a face seal O-ring 54 preferably is situated within a groove seat 49 in the underside of the interior of the connection flange 46 to sealably close the contact between the change-out flange 40 and the casing bowl 14. Further, a PTFE thread seal 61 of known type and use preferably is installed within the interlocked threads connecting the casing hub 44 to the casing 14, as indicated in FIG. 2A. When needed, the locking pins 56 can be counter-rotated and "backed out" of their associated channels 52. Doing so releases the tubing hanger 20 for upward movement, if desired, without having to detach the change-out flange 40 from the casing bowl 14. It advantageously is possible thereby to manipulate the tubing hanger and its dependent tubing through the central aperture 47 of the change-out flange 40 while the flange remains in place upon the wellhead.

Thus, lockdown pins 56, preferably four in number, are used to secure the top of the tubing hanger 20 against upward movement relative to the casing 14. Referring to FIGS. 2 and 2A, as well as FIGS. 3 and 5, a lockdown pin 56 is screwed into each of the lockdown pin channels 52 until the forward or radially inner end of each pin extends completely through the channel and into the central aperture 47. Each pin 56 is long enough, and is turned into its associated channel 52 far enough, so that the inner end 57 of the pin is disposed above the top shoulder 36 of the tubing hanger 20. When fully installed, the inner end of each pin 56 preferably engages the shoulder 36 of the tubing hanger 20 as seen in FIG. 2A. Such engagement secures the tubing hanger 20 against upward movement in relation to the casing bowl 14.

By replacing a standard cap 26 (FIG. 1) with the present change-out flange 40, it becomes possible to install a heavy-duty gate valve 60 on the wellhead assembly. In the event of an assembly failure above the gate valve 60, the valve can be closed to isolate from well pressure everything above the gate valve on the wellhead assembly. Any broken or worn device causing the failure can then be safely replaced. An adapter flange (not shown) above the gate valve 60 can be replaced as needed.

Figure 6:
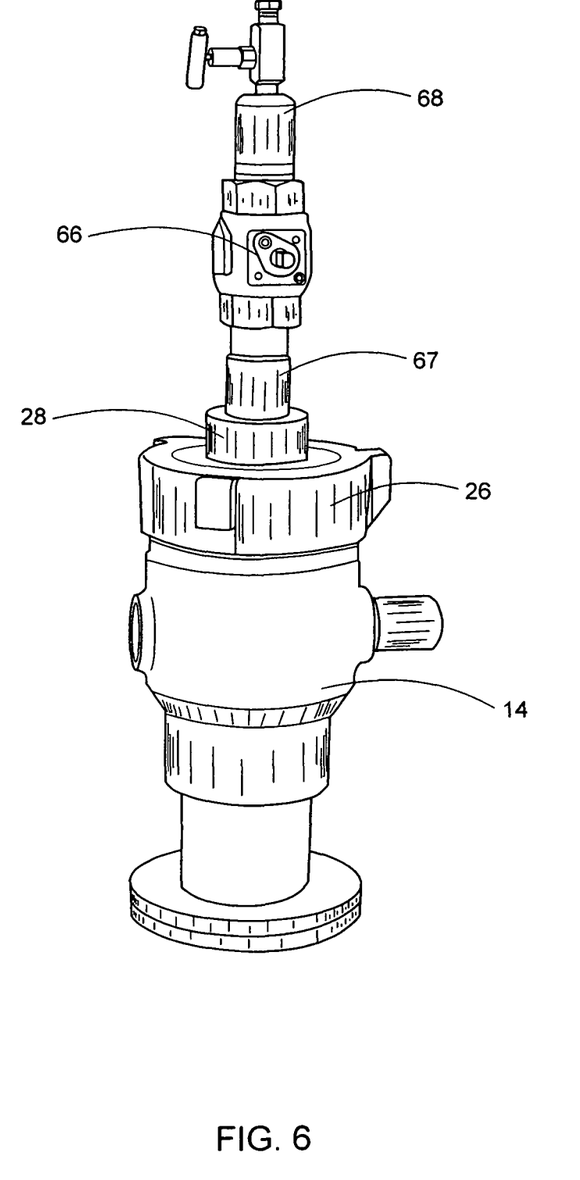
FIG. 6 is a perspective side view of a standard independent wellhead assembly according to the prior art, including a conventional screw-down cap securing the tubing hanger, and a screw-on valve engaged into the tubing hanger.

Accordingly, one method according to this disclosure is to replace a ball valve screwed into the top of a tubing hanger with a master gate valve bolted to a change-out flange 40 that is securely mounted atop the casing. FIG. 6 shows a standard independent wellhead according to typical convention. A ball valve 66 is attached to the well head via a swage 67 that is screwed into the outlet hub 28 of the tubing hanger (see FIG. 1). The outlet hub of the tubing hanger extends up through the central aperture of the wellhead cap 26, which is screwed to the top of the casing bowl 14. This configuration may be undesirable due to the vulnerability of the assembly to possible catastrophic failure, for example lateral bending moments accidentally applied to the upper valve 68 causing a rupture between the ball valve and swage 67, resulting in uncontrolled blow-out from the well.

The same independent wellhead is seen in FIG. 7, after the invention has been practiced to convert the well head to a safer, more versatile configuration. The cap 26 has been removed, and the change-out flange 40 installed in its place. The flange 40 is screwed onto the casing bowl 14. The lockdown pins 56 are actuated to be screwed inward toward the axis of the assembly. Fully actuated, the lockdown pins 56 are against or just above the top of the tubing hanger, thus securing the tubing hanger (not seen in FIG. 7) within the casing 14. Using twelve heavy-gage bolts, the durable master gate valve 60 is bolted to the flange 40. The wellhead assembly so configured is safer and more efficient that the previous conventions (e.g., as seen in FIG. 6). Because the bolt pattern in flange 40 is standardized, any of a variety of other devices besides the depicted gate valve may be securely bolted to the wellhead, without having to disturb the tubing hanger and production tubing, and without altering the casing bowl 14 in any way.

Most generally characterized, there is disclosed a method for using a change-out flange 40 (as described) upon an oil or gas wellhead, featuring the steps of detaching an item of wellhead equipment (e.g., 66 and/or 67 and/or 68) from the wellhead tubing hanger 20 (i.e., outlet hub 28), unscrewing the cap 26 from a wellhead casing 14; screwably mounting the change-out flange 40 upon the wellhead casing 14, inserting lockdown pins 56 radially through lockdown pin channels 52 in the change-out flange until portions of the lockdown pins extend laterally above a top surface (e.g., shoulder 36) of the tubing hanger, and then bolting an item of wellhead equipment (e.g., 60) upon the change-out flange by disposing bolts through the equipment and through the connection apertures 42 in the change-out flange.

Although the invention has been described in detail with particular reference to these preferred embodiments, other embodiments can achieve the same results. Variations and modifications of the present invention will be obvious to those skilled in the art and it is intended to cover with the appended claims all such modifications and equivalents.

What is claimed is:

1. A change-out flange for use upon an oil or gas wellhead, the change-out flange comprising:
   a connection flange having a central axis and an outer perimeter;
   a plurality of connection apertures defined axially through the connection flange;
   a casing hub formed integrally with and depending coaxially from a bottom of the connection flange;
   a central aperture defined axially through the connection flange and the casing hub;
   a plurality of connection apertures defined axially through the connection flange; and
   at least one lockdown pin channel defined radially through the connection flange from the outer perimeter to the central aperture
   wherein the casing hub further comprises hub screw threads defined interiorly to the casing hub and around the central aperture, the hub screw threads adapted for complementary screwed engagement with a wellhead casing.

2. The apparatus according to claim 1 wherein the connection flange and the casing hub are substantially cylindrical about the central axis.

3. The apparatus according to claim 1 further comprising hub screw threads defined in the casing hub and around the central aperture, the hub screw threads adapted for complementary screwed engagement with a top of a casing at a wellhead.

4. The apparatus according to claim 1 further comprising at least one lockdown pin removably insertable into the at least one lockdown pin channel.

5. The apparatus according to claim 4 wherein the at least one lockdown pin channel is threaded along a portion of its axial length, and wherein the at least one lockdown pin is complementarily threaded along a portion of its axial length, whereby the at least one lockdown pin is screwably engageable into the at least one pin channel.

6. The apparatus according to claim 5 wherein the at least one lockdown pin may be screwably engaged into a lockdown position within the pin channel, and wherein further when the lockdown pin is in the lockdown position, a substantial portion of the length of the lockdown pin extends into the central aperture.

7. The apparatus according to claim 6 wherein the at least one lockdown pin channel comprises a plurality of pin channels and the at least one lockdown pin comprises a plurality of lockdown pins corresponding in number to the pin channels.

8. The apparatus according to claim 7 comprising four equi-spaced pin channels.

9. A change-out flange for use with a casing and tubing hanger of an oil or gas wellhead, the change-out flange comprising:
   a connection flange having a central axis and an outer perimeter;
   a plurality of connection apertures defined axially through the connection flange;
   a casing hub depending coaxially from a bottom of the connection flange;
   a central aperture defined axially through the connection flange and the casing hub;
   at least one lockdown pin channel defined radially through the connection flange from the outer perimeter to the axial central aperture; and
   at least one lockdown pin removably insertable into the at least one lockdown pin channel;
   wherein the casing hub further comprises hub screw threads defined interiorly to the casing hub and around the central aperture, the hub screw threads adapted for complementary screwed engagement with the wellhead casing, and
   wherein the at least one lockdown pin may be engaged into a lockdown position within the pin channel, and wherein further when the lockdown pin is in the lockdown position, a substantial portion of the length of the lockdown pin extends into the central aperture and into close adjacency with a top surface of the tubing hanger.

10. The apparatus according to claim 9 wherein the connection flange and the casing hub are substantially cylindrical about the central axis, and an outside diameter of the connection flange exceeds an outside diameter of the casing hub.

11. The apparatus according to claim 9 wherein the at least one lockdown pin channel is threaded along a portion of its axial length, and wherein the at least one lockdown pin is complementarily threaded along a portion of its axial length, whereby the at least one lockdown pin is screwably engageable into the at least one pin channel.

12. The apparatus according to claim 9 wherein the at least one lockdown pin channel comprises a plurality of pin channels and the at least one lockdown pin comprises a plurality of lockdown pins corresponding in number to the pin channels.

13. A method for using a change-out flange upon an oil or gas wellhead, comprising:
   detaching an item of wellhead equipment from a wellhead tubing hanger;
   unscrewing a cap from a wellhead casing;
   screwably mounting a change-out flange upon the wellhead casing, the change-out flange comprising:
      a connection flange having a central axis and an outer perimeter;
      a plurality of connection apertures defined axially through the connection flange;
      a casing hub formed integrally with and depending coaxially from a bottom of the connection flange;
      a central aperture defined axially through the connection flange and the casing hub;
      a plurality of connection apertures defined axially through the connection flange; and
      lockdown pin channels defined radially through the connection flange from the outer perimeter to the central aperture,
   wherein the casing hub further comprises hub screw threads defined interiorly to the casing hub and around the central aperture, the hub screw threads adapted for complementary screwed engagement with the wellhead casing;
   inserting the lock down pins radially through lockdown pin channels in the change-out flange until portions of the lockdown pins extend laterally above a top surface of the tubing hanger; and
   bolting an item of wellhead equipment upon the change-out flange by disposing bolts through connection apertures in the change-out flange.

* * * * *